US012637610B2

(12) United States Patent
Song et al.

(10) Patent No.: US 12,637,610 B2
(45) Date of Patent: May 26, 2026

(54) LOW CONCENTRATION SYNTHETIC POLYMER FRACTURING FLUID WITH ASCORBIC ACID

(71) Applicants: CNPC USA Corporation, Houston, TX (US); Beijing Huamei, Inc., Beijing (CN); China National Petroleum Corporation, Beijing (CN)

(72) Inventors: Lulu Song, Houston, TX (US); Stephanie Yu, Houston, TX (US)

(73) Assignees: CNPC USA Corporation, Houston, TX (US); Beijing Huamei, Inc., Beijing (CN); China National Petroleum Corporation, Beijing (CN)

( * ) Notice: Subject to any disclaimer, the term of this patent is extended or adjusted under 35 U.S.C. 154(b) by 0 days.

(21) Appl. No.: 19/196,476

(22) Filed: May 1, 2025

(65) Prior Publication Data

US 2025/0270440 A1     Aug. 28, 2025

Related U.S. Application Data

(63) Continuation of application No. 18/143,840, filed on May 5, 2023, now Pat. No. 12,312,536.

(51) Int. Cl.
| | |
|---|---|
| *C09K 8/68* | (2006.01) |
| *C09K 8/70* | (2006.01) |
| *C09K 8/80* | (2006.01) |
| *E21B 43/26* | (2006.01) |
| *E21B 43/267* | (2006.01) |
| *E21B 43/27* | (2006.01) |

(52) U.S. Cl.
CPC ............... *C09K 8/685* (2013.01); *C09K 8/68* (2013.01); *C09K 8/70* (2013.01); *C09K 8/80* (2013.01); *E21B 43/26* (2013.01); *E21B 43/267* (2013.01); *E21B 43/27* (2020.05); *C09K 2208/26* (2013.01)

(58) Field of Classification Search
None
See application file for complete search history.

(56) References Cited

U.S. PATENT DOCUMENTS

| | | | | |
|---|---|---|---|---|
| 12,312,536 B2 * | 5/2025 | Song | .......................... | C09K 8/70 |
| 2010/0048430 A1 * | 2/2010 | Funkhouser | ........... | C09K 8/685 |
| | | | | 507/219 |
| 2020/0048538 A1 * | 2/2020 | Song | ...................... | C09K 8/685 |
| 2021/0246768 A1 * | 8/2021 | Eluru | ..................... | C09K 8/575 |

* cited by examiner

*Primary Examiner* — Andrew Sue-Ako
(74) *Attorney, Agent, or Firm* — Hogan Lovells US LLP

(57)     ABSTRACT

A fracturing fluid for fracturing subterranean formations comprising ascorbic acid. The fracturing fluid can use ascorbic acid to delay increases in viscosity until desired. The viscosity increase can then be maintained over a period of time to perform fracturing operations.

20 Claims, 7 Drawing Sheets

Vis (7gpt UltraGel HT, 1ppt ascorbic acid, 2gpt XL1, pHi~5.8 by acetic acid)

Vis (7gpt UltraGel HT, 10ppt Na2S2O3.5H2O, 2gpt XL1, pHi~5.9 by acetic acid)

Sample Temp (140C)

—— Vis (7gpt UltraGel, 1ppt ascorbic acid, 2gpt XL1, pHi~5.8 by acetic acid)

------ Vis (7gpt UltraGel, 10ppt Na2S2O3.5H2O, 2gpt XL1, pHi~5.8 by acetic acid)

— · — Sample Temp (120C)

Time (min)

——— Vis (7gpt UltraGel, 1ppt ascorbic acid, 2gpt XL1, pHi~5.8 by acetic acid)

------ Vis (7gpt UltraGel, 10ppt Na2S2O3.5H2O, 2gpt XL1, pHi~5.8 by acetic acid)

—·— Sample Temp (100C)

Time (min)

——— Vis (7gpt UltraGel, 1ppt ascorbic acid, 2gpt XL1, pHi~5.8 by acetic acid)

— ·· Vis (7gpt UltraGel, 1ppt ascorbic acid, 2gpt XL1, 15ppt EnAPS, pHi~5.8 by acetic acid)

~ · ~ Sample Temp (100C)

LOW CONCENTRATION SYNTHETIC POLYMER FRACTURING FLUID WITH ASCORBIC ACID

CROSS-REFERENCE TO RELATED APPLICATION

The present Application is a continuation of U.S. patent application Ser. No. 18/143,840 filed May 5, 2023 titled LOW CONCENTRATION SYNTHETIC POLYMER FRACTURING FLUID WITH ASCORBIC ACID, the entire contents of which is incorporated by reference herein and form a part of this specification for all intents and purposes.

BACKGROUND

This disclosure relates generally to fracturing fluid formulations and more specifically to fracturing fluids with alternative viscosity stabilizers.

Field Of The Invention

Hydrocarbons such as oil and gas may be produced from wells that are drilled into hydrocarbon reservoirs. For reservoirs that are of low permeability or with formation damage, the flow of the hydrocarbon into the production wells may be undesirably low. In these cases, the wells are often stimulated by hydraulic fracturing operations. For hydraulic fracturing treatment, a pad, which is a viscous fluid free of proppants, is first pumped at a rate and pressure high enough to break down the formation and initiate fractures. A fracturing fluid (carrying fluid) is then pumped to transport proppants such as sand and ceramic particles into the fractures. The proppants are used to keep the fractures open for the hydrocarbons to flow into the wellbore for recovery.

Fracturing fluid systems are comprised of water, proppant, and additives. The additives control rheological properties of the fracturing fluid system so as to propagate fractures and allow the transport of proppant for different formations under various conditions. High viscosity fracturing relies on gelling agents, such as guar gum, to increase viscosity and suspend the proppant for delivery as far as possible into the cracks of the fracture. High rate or high velocity relies on low friction and fast pumping fracturing fluid systems to reach deeper into a rock formation. Additives can be principally chosen for a desired ability to suspend proppant or to be pumped at a particular velocity.

Additives can also be selected for recovery of the fracturing fluid system. Once the proppant is delivered, the fluid components of the fracturing fluid system must be removed. Additional water can be pumped to flush the fracture of the fracturing fluid system. During the fracturing fluid recovery, additives can be released into the fracturing fluid system to alter the gelling agent, so as to reduce viscosity and more easily release the proppant from suspension. The fracturing fluid system waste contains the water and additives, which can contaminate the environment.

Formation damage can occur as result of the composition of the wellbore fluids. Formation damage can cause a reduction in the productivity of the well. The reduced productivity can be due to reduced permeability of the surface of the wellbore. Guar-type fluids typically used in these applications can leave residue in the fractures which can result in formation damage. By reducing the gelling agent within the fracturing fluid, the formation damage and materials cost can be reduced. Therefore, there is a need in the art for stable fracturing fluids that minimize potential formation damage.

SUMMARY

A first embodiment of the present technology provides for a method of well stimulation through a wellbore. The method first comprises forming a fracturing fluid including water, a proppant, a gelling agent, a stabilizer of ascorbic acid, a crosslinking agent, and a pH adjuster.

The gelling agent can be a high molecular weight synthetic copolymer resistant to hydrolysis. The high molecular weight synthetic copolymer can be a copolymer of acrylamide, 2-Acrylamido-2-methylpropane sulfonic acid (AMPS), and vinyl phosphonate. The ascorbic acid can be present in concentrations between about 0.5 to 2 ppt in the fracturing fluid.

The crosslinker of the fracturing fluid can be a metal crosslinker. The metal crosslinker can be zirconium-based or titanium-based. The cross-linking can link the polymer with the metal ions of the cross-linking agent. The cross-linking can increase the viscosity of the fracturing fluid system. The fracturing fluid can be capable of maintaining a viscosity of above 100 cps for at least 90 minutes at temperatures between 100 and 160 degrees Celsius.

The pH adjuster of the fracturing fluid can be an acid such as acetic acid. The fracturing fluid can further include a breaker such as an oxidizer. In some embodiments, the fracturing fluid may not include sodium thiosulfate. The fracturing fluid can be capable of maintaining a viscosity of above 100 cps for at least 90 minutes at temperatures between 100 and 160 degrees Celsius. The high molecular weight synthetic copolymer can be present in concentrations of about 5-7 gpt in emulsion form or about 11.2-15.7 pounds per gallon as a dry powder.

The gelling agent can be cross-linked with the cross-linking agent. The cross-linking can be delayed by the addition of the ascorbic acid. The pH of the fracturing fluid system can be adjusted by the pH adjuster. The resultant pH can be between about 5.5 to 6.5. The cross-linking can occur at a pre-selected depth. The delay from the ascorbic acid can modify this depth.

The fracturing fluid system can be pumped into the rock formation. The ascorbic acid can be formed at this time by a combination of an ascorbic salt and an acid. This can result in fracturing the rock formation at temperatures between 100-149 degrees Celsius. The remaining fluid components can then be recovered from the wellbore.

The proppant can be of a granular material. When pumped into the rock formation, the proppant can prevent fractures formed by the fracturing fluid system from closing.

The fracturing fluid system can further include an inverting surfactant. The inverting surfactant can invert an emulsion polymer for the hydration of the emulsion polymer in the water. The polymer can be an emulsion polymer.

The fracturing fluid system can also include a breaker. The breaker can be an oxidizing breaker of sodium bromate, ammonium persulfate, or peroxide. The breaker can be encapsulated ammonium persulfate.

A buffer may also be present in the fracturing fluid. The buffer can be sodium bicarbonate or formic acid.

The fracturing fluid can also include clay stabilizers, nonemulsifiers, surfactants aiding flowback, scale inhibitors, or biocides.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
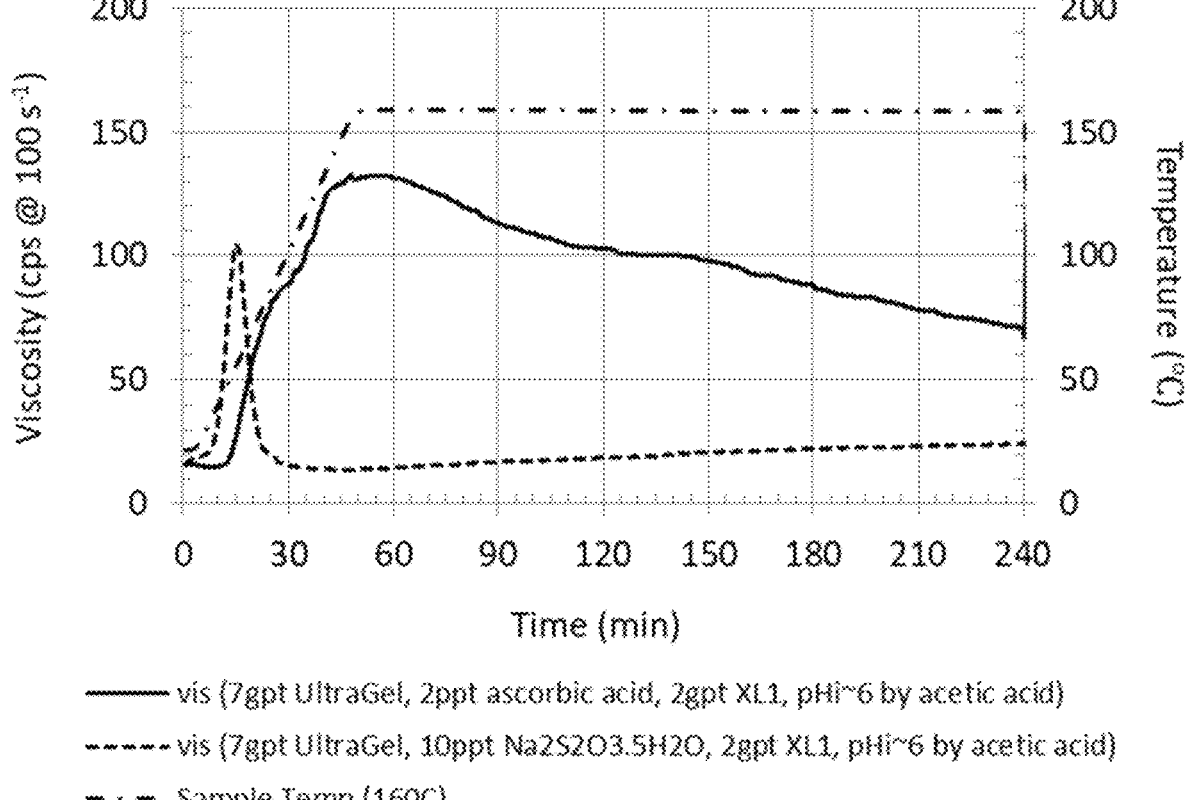
FIG. 1 depicts exemplary embodiments of the present technology with comparison to conventional temperature stabilizers with respect to changing viscosity over time at 160 degrees Celsius and an initial pH of about 6.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment," "an embodiment," "certain embodiments," or "other embodiments" of the present invention are not intended to be interpreted as excluding the existence of additional embodiments that also incorporate the recited features. Furthermore, reference to terms such as "above," "below," "upper,"

"lower," "side," "front," "back," or other terms regarding orientation are made with reference to the illustrated embodiments and are not intended to be limiting or exclude other orientations.

The present technology provides for a crosslinked synthetic-polymer-based fracturing fluid system which are stable at the temperature range of 100-160° C. at a significantly lower dosage of a gelling agent. By directly crosslinking a friction reducer to form a crosslinked fracturing fluid, logistics and field operations can be simplified as there may be no requirement of additional gelling agents. Additionally, guar-type fluids typically used in these applications can leave residue in the fractures which can result in formation damage. By reducing the gelling agent within the fracturing fluid, the formation damage and materials cost can be reduced.

Ascorbic acid can function synergistically with the gelling agent and the crosslinker. This can result in maintained viscosity values at lower dosages of synthetic gelling agent. In comparison, common conventional stabilizers such as sodium thiosulfate, which can stabilize fracturing fluids by scavenging oxygen, may not maintain fluid viscosity in similar conditions, requiring additional gelling agent.

The fracturing fluid can be comprised of a proppant, water, a copolymer, ascorbic acid, a crosslinker, and a pH adjuster. The fracturing fluid can be capable of maintaining a viscosity of above 100 cps for at least 90 minutes at temperatures between 100 and 160 degrees Celsius.

The proppant can be of a granular material. When pumped into the rock formation, the proppant can prevent fractures formed by the fracturing fluid system from closing.

The copolymer can be a high molecular weight synthetic copolymer resistant to hydrolysis. The high molecular weight synthetic copolymer can be a copolymer of acrylamide, 2-Acrylamido-2-methylpropane sulfonic acid (AMPS), and vinyl phosphonate. The high molecular weight synthetic copolymer can be present in concentrations of about 5-7 gpt in emulsion form or about 11.2-15.7 pounds per gallon as a dry powder.

The ascorbic acid can be present in concentrations between about 0.5 to 2 ppt in the fracturing fluid. The ascorbic acid can also be formed within the fracturing fluid through the use of an ascorbate salt and an acid.

The crosslinker can be a metallic crosslinker. In some embodiments, the metallic crosslinker can be a zirconium crosslinker or a titanium crosslinker. The crosslinker can have metal ions which can crosslink the copolymer. This can result in an increase in viscosity of the fracturing fluid. The crosslinking can be delayed due to the presence of the ascorbic acid in the fracturing fluid. This can be used to control the amount of time and/or depth within the wellbore before the crosslinking and associated viscosity increase occurs.

The pH adjuster can be acetic acid or any other appropriate acid for the fracturing fluid.

The fracturing fluid can also include an inverting surfactant. The inverting surfactant can invert the emulsion and help to hydrate the copolymer in the fracturing fluid. This can be used for when the copolymer is an emulsion polymer.

A breaker may also be present in the fracturing fluid. The breaker can lower the viscosity of the fracturing fluid after fracturing has occurred. The breaker can be controlled to a pre-determined time or depth at which the breaker reduces the viscosity of the fracturing fluid. In one exemplary embodiment, the breaker can be encapsulated to control the timing or depth of release. The breaker can be an oxidizer in the fracturing fluid. In some embodiments, the breaker can be sodium bromate, ammonium persulfate, or a peroxide. The breaker can be an encapsulated ammonium persulfate.

A buffer may also be present in the fracturing fluid. The buffer can be sodium bicarbonate or formic acid.

Additional additives can also be included in the fracturing fluid. These additional additives can include clay stabilizers, nonemulsifiers, surfactants aiding flowback, scale inhibitors, or biocides.

The fracturing fluid can be crosslinked by the reaction between the gelling agent and cross-linking agent. The ascorbic acid can be used to delay the crosslinking. The pH can then be adjusted by the pH adjuster. The resulting pH can be between about 5.5 to 6.5.

The fracturing fluid can then be pumped into the rock formation where the rock formation is fractured. The fracturing can occur at temperatures between 100-149 degrees Celsius. After fracturing, the viscosity of the fluid can be lowered by a breaker so that the fluid can be recovered from the wellbore.

Figure 2:
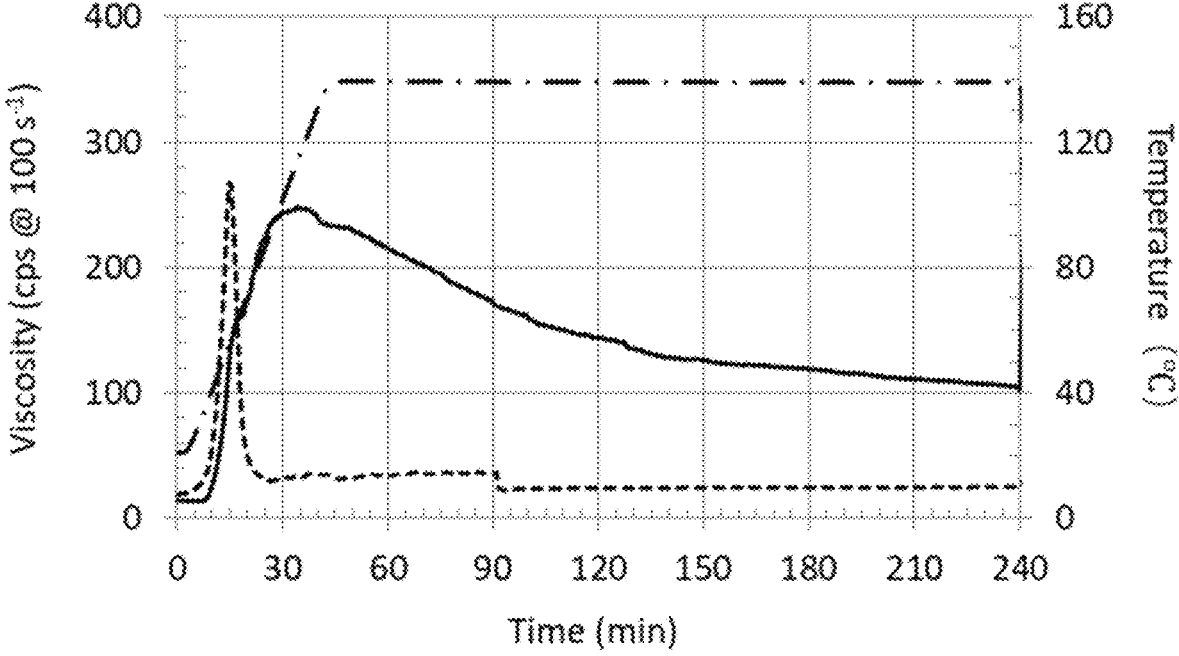
FIG. 2 depicts exemplary embodiments of the present technology with comparison to conventional temperature stabilizers with respect to changing viscosity over time at 140 degrees Celsius and an initial pH of about 5.8-5.9.
Figure 3:
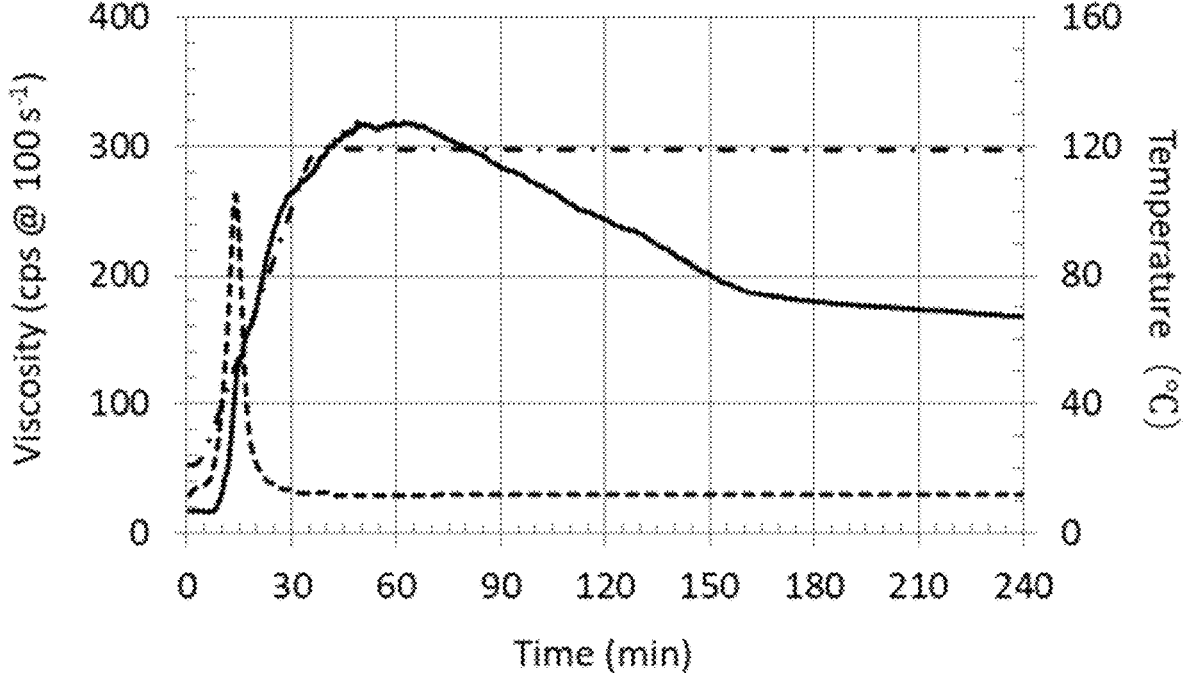
FIG. 3 depicts exemplary embodiments of the present technology with comparison to conventional temperature stabilizers with respect to changing viscosity over time at 120 degrees Celsius and an initial pH of about 5.8.
Figure 4:
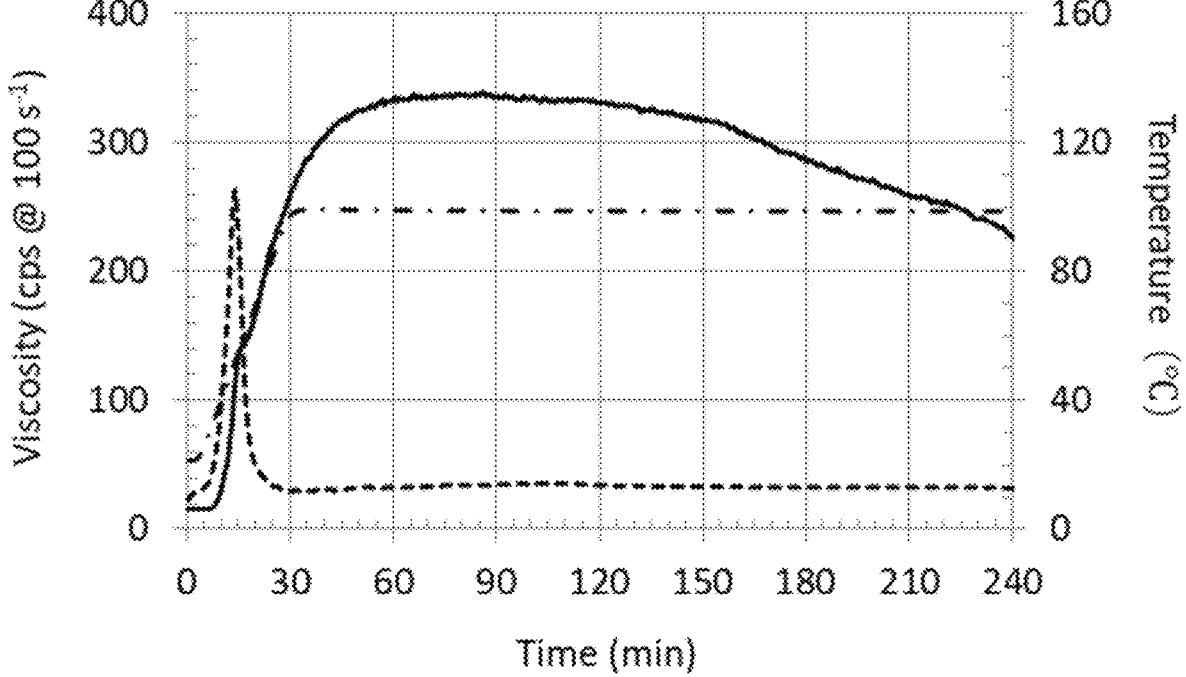
FIG. 4 depicts exemplary embodiments of the present technology with comparison to conventional temperature stabilizers with respect to changing viscosity over time at 100 degrees Celsius and an initial pH of about 5.8.

FIGS. 1 through 4 provide exemplary comparisons for the present technology with traditional fluids using sodium thiosulfate as a viscosity stabilizer. FIG. 1 is a comparison at 160 degrees Celsius, FIG. 2 is a comparison at 140 degrees Celsius, FIG. 3 is a comparison at 120 degrees Celsius, and FIG. 4 is a comparison at 100 degrees Celsius.

Each of the FIGS. 1 through 4 provide similar conditions of the fracturing fluid. The gelling agent of UltraGel is provided in emulsion form at a concentration of 7 gpt which is equivalent to about 15.7 pounds/1000 gallons of dry powder. 2 gpt of XL1, a zirconium-based cross-linking agent, is also added to each system. In the present technology, 2 ppt ascorbic acid was added to the test at 160 degrees Celsius while 1 ppt was added to each of the other tests. 10 ppt of sodium thiosulfate was added to each of the comparisons in FIGS. 1-4. Finally, the pH was adjusted to about 5.8-6.0 for each of the tests through the addition of acetic acid to reach the listed initial fluid pH (pHi) in the figures.

FIG. 1 depicts where the composition with ascorbic acid maintains a viscosity of 100 cps or above for at least 90 minutes at 160 degrees Celsius (the solid black curve) while the viscosity of the composition with sodium thiosulfate only peaks to about 100 cps and then quickly drops to only 20-25 cps even before the fluid reaches 160 degrees Celsius. Similar results are provided in FIGS. 2-4 wherein the ascorbic acid samples maintain a high viscosity over a much greater time period and with lower concentrations than the sodium thiosulfate comparisons.

Figure 5:
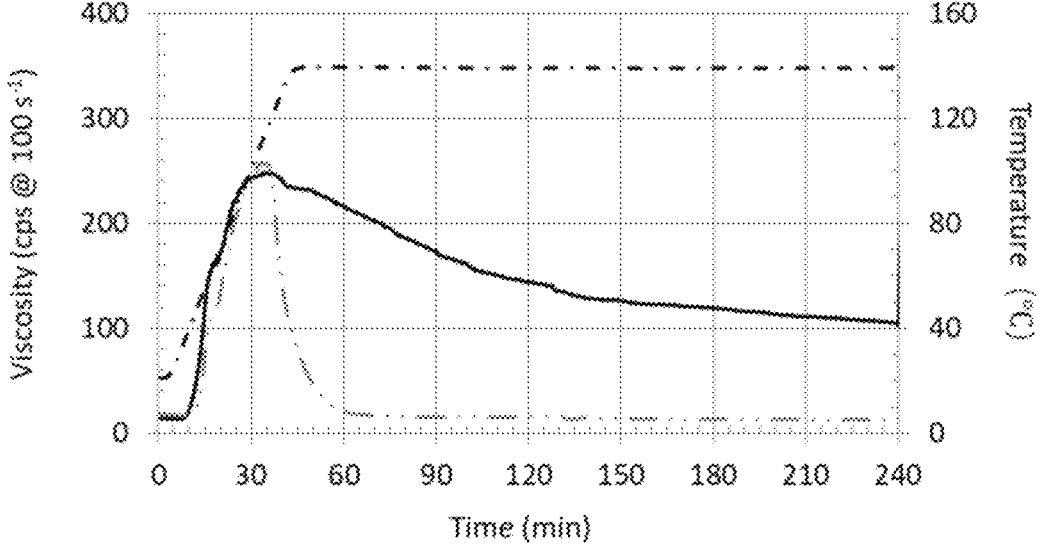
FIG. 5 depicts exemplary embodiments of the present technology with and without a breaker of about 15 ppt encapsulated ammonium persulfate with respect to changing viscosity over time at 140 degrees Celsius and an initial pH of about 5.8-5.9.
Figure 6:
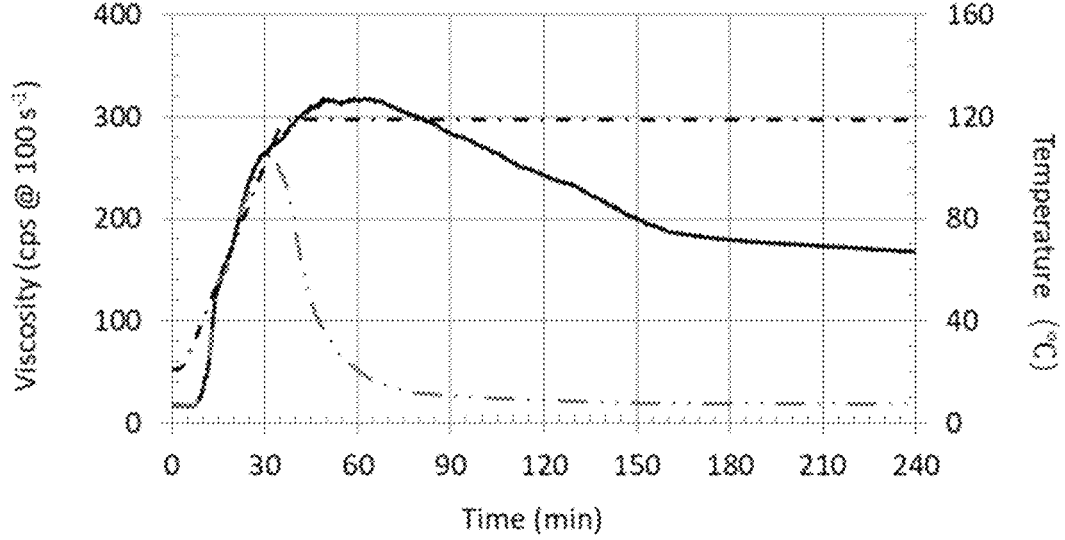
FIG. 6 depicts exemplary embodiments of the present technology with and without a breaker of about 15 ppt encapsulated ammonium persulfate with respect to changing viscosity over time at 120 degrees Celsius and an initial pH of about 5.8-5.9.
Figure 7:
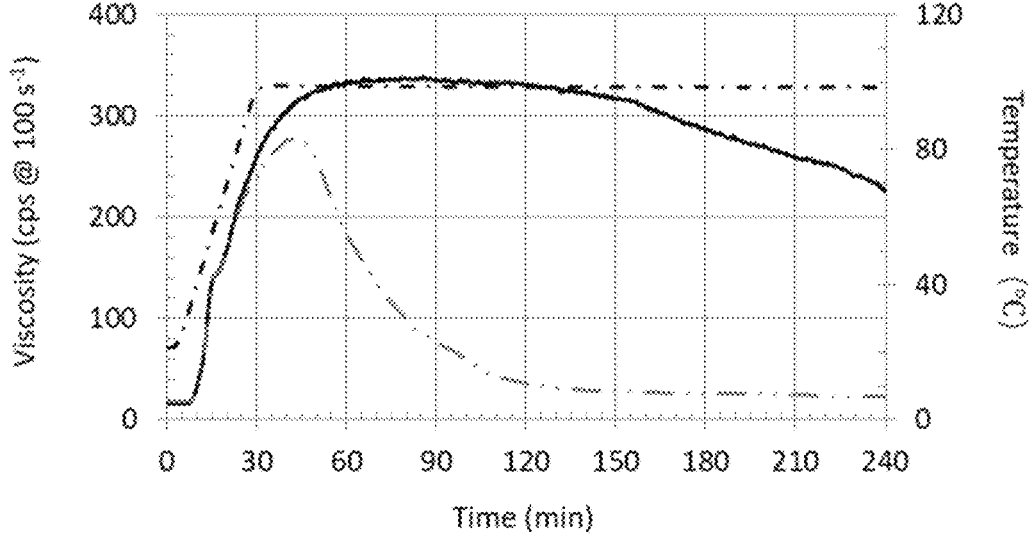
FIG. 7 depicts exemplary embodiments of the present technology with and without a breaker of about 15 ppt encapsulated ammonium persulfate with respect to changing viscosity over time at 100 degrees Celsius and an initial pH of about 5.8-5.9.

FIGS. 5-7 provide exemplary demonstrations of the breaking performance of present technology with the inclusion of a breaker (the broken gray curves). The corresponding performance of the present technology without a breaker is given for reference. The gelling agent of UltraGel is provided in emulsion form at a concentration of 7 gpt which is equivalent to about 15.7 pounds/1000 gallons of dry powder. 2 gpt of XL1, a zirconium-based cross-linking agent, is also added to each system. 1 ppt of ascorbic acid is also provided in the mixture. Finally, the pH was adjusted to about 5.8-5.9 for each of the tests through the addition of acetic acid to reach the listed initial fluid pH (pHi) in the figures.

In each of the FIGS. 5-7, the solid black line does not include the addition of a breaker to the fluid. The broken gray line includes 15 ppt of an encapsulated ammonium persulfate breaker. Tests were performed at temperatures of 140 degrees Celsius in FIG. 5, 120 degrees Celsius in FIG. 6, and 100 degrees Celsius in FIG. 7.

In each of FIGS. 5-7 the viscosity can be reduced with an oxidizing breaker. Different breaking rates can be obtained by adjusting the loading of a breaker to the fracturing fluid.

Although the technology herein has been described with reference to embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A fracturing fluid system, comprising:
a proppant;
water;
a gelling agent, wherein the gelling agent is present in a concentration of from 5 to 7 gallons per thousand (gpt);
a stabilizer comprising ascorbic acid, wherein the ascorbic acid ranges from about 0.5 to 2 parts per thousand (ppt);
a cross-linking agent; and
a pH adjuster, wherein the pH adjuster adjusts a pH of the fracturing fluid system with the pH adjuster to about 5.5 to 6.5;
wherein the fracturing fluid system is capable of maintaining a viscosity above about 100 centipoise (cP) for at least 90 minutes.

2. The fracturing fluid system of claim 1, wherein the fracturing fluid system is capable of fracturing a rock formation at a temperature between about 100 to 149 degrees Celsius.

3. The fracturing fluid system of claim 1, wherein the cross-linking agent is cross-linked with the gelling agent.

4. The fracturing fluid system of claim 3, wherein the ascorbic acid delays the cross-linking of the gelling agent with the cross-linking agent.

5. The fracturing fluid system of claim 4, wherein an amount of ascorbic acid in the fracturing fluid system is adjusted in order to delay the cross-linking for a set amount of time.

6. The fracturing fluid system of claim 1, wherein the proppant is comprised of a granular material to prevent fractures in a rock formation from closing.

7. The fracturing fluid system of claim 1, wherein the gelling agent is comprised of a synthetic polymer resistant to hydrolysis.

8. The fracturing fluid system of claim 7, further comprising:
an inverting surfactant to invert an emulsion polymer for hydration of the emulsion polymer in the water, wherein the synthetic polymer is the emulsion polymer.

9. The fracturing fluid system of claim 1, wherein the gelling agent is comprised of a copolymer derived from acrylamide, 2-Acrylamido-2-methylpropane sulfonic acid (AMPS), and vinyl phosphonate.

10. The fracturing fluid system of claim 1, wherein the cross-linking agent is a zirconium-based compound or a titanium-based compound.

11. The fracturing fluid system of claim 1, further comprising:
a breaker to reduce the viscosity of the fracturing fluid system after the fracturing fluid system has fractured a rock formation.

12. The fracturing fluid system of claim 11, wherein timing and depth of release of the breaker is controlled in order to break the fracturing fluid system.

13. The fracturing fluid system of claim 11, wherein the breaker is comprised of an oxidizing breaker.

14. The fracturing fluid system of claim 13, wherein the oxidizing breaker is sodium bromate, ammonium persulfate, or peroxide.

15. The fracturing fluid system of claim 13, wherein the oxidizing breaker is encapsulated ammonium persulfate.

16. The fracturing fluid system of claim 1, wherein the ascorbic acid is formed in the fracturing fluid system by loading an ascorbate salt and an acid into the fracturing fluid system.

17. The fracturing fluid system of claim 1, further comprising:

a buffer.

18. The fracturing fluid system of claim 17, wherein the buffer is sodium bicarbonate or formic acid.

19. The fracturing fluid system of claim 1, wherein the fracturing fluid system does not comprise sodium thiosulfate.

20. The fracturing fluid system of claim 1, further comprising:

clay stabilizers, nonemulsifiers, surfactants aiding flowback, scale inhibitors, or biocides.

\* \* \* \* \*